US008433292B2

(12) United States Patent
McGowan et al.

(10) Patent No.: US 8,433,292 B2
(45) Date of Patent: Apr. 30, 2013

(54) NETWORK BASED MOBILE USER PROXY AND AGENT

(75) Inventors: James W. McGowan, Whitehouse Station, NJ (US); Michael C. Recchione, Nutley, NJ (US)

(73) Assignee: Alcatel Lucent, Paris (FR)

( * ) Notice: Subject to any disclaimer, the term of this patent is extended or adjusted under 35 U.S.C. 154(b) by 1436 days.

(21) Appl. No.: 11/819,969

(22) Filed: Jun. 29, 2007

(65) Prior Publication Data

US 2009/0005098 A1 Jan. 1, 2009

(51) Int. Cl.
*H04L 12/58* (2006.01)
(52) U.S. Cl.
USPC .............. 455/412.1; 455/440; 455/456.1; 455/456.2; 455/456.3; 455/456.4; 455/456.5; 455/456.6
(58) Field of Classification Search ............... 709/207; 455/512, 166.2; 370/395, 444, 412, 413, 370/415, 429
See application file for complete search history.

(56) References Cited

U.S. PATENT DOCUMENTS

| 6,240,292 B1 * | 5/2001 | Haberman et al. ............ 455/439 |
| 6,956,818 B1 * | 10/2005 | Thodiyil ....................... 370/230 |
| 7,068,993 B2 * | 6/2006 | Rai et al. .................... 455/404.1 |
| 7,167,713 B2 * | 1/2007 | Anderson .................. 455/456.1 |
| 7,317,923 B2 * | 1/2008 | Koshino et al. .............. 455/455 |
| 7,471,644 B2 * | 12/2008 | Sakai ............................ 370/254 |
| 2002/0018455 A1 * | 2/2002 | Yokoyama .................... 370/338 |
| 2003/0003906 A1 * | 1/2003 | Demers et al. ................ 455/424 |
| 2005/0053029 A1 * | 3/2005 | Lee et al. ....................... 370/328 |
| 2006/0286992 A1 * | 12/2006 | Vitebsky et al. ............. 455/512 |
| 2007/0133528 A1 * | 6/2007 | Jin et al. ........................ 370/389 |
| 2007/0206620 A1 * | 9/2007 | Cortes et al. .................. 370/412 |
| 2007/0258407 A1 * | 11/2007 | Li et al. ........................ 370/331 |
| 2008/0085719 A1 * | 4/2008 | Kuchibhotla et al. ...... 455/452.1 |

FOREIGN PATENT DOCUMENTS

| DE | 10 2004 047 689 | 4/2006 |
| WO | WO 01/35586 | * 5/2001 |
| WO | WO 2004/072494 | 8/2004 |
| WO | WO 2005/072494 | 8/2005 |

OTHER PUBLICATIONS

International Preliminary Search Report dated Jan. 14, 2010.
International Search Report and Written Opinion dated Oct. 10, 2008.

* cited by examiner

*Primary Examiner* — Olumide T Ajibade Akonai
*Assistant Examiner* — Edward Zhang
(74) *Attorney, Agent, or Firm* — Harness, Dickey & Pierce, P.L.C.

(57) ABSTRACT

In one example embodiment of the present invention, a method of managing information at a base station in a wireless network includes determining whether first information is at least one of low priority information and high priority information. The method further includes queuing the information if the information is determined to be low priority information, and sending the information to a mobile station if the information is determined to be high priority information.

20 Claims, 5 Drawing Sheets

NETWORK BASED MOBILE USER PROXY AND AGENT

BACKGROUND OF THE INVENTION

Handling data transmission between a wireless network and a mobile station has been a developing concern in third generation (3G) wireless communication systems such as Universal Mobile Telecommunications System (UMTS) and Evolution-Data Optimized or Evolution-Data only (EV-DO). Generally, data transmission means audio and/or video broadcasts and/or data services.

With the EV-DO and UMTS broadband networks, frequent communication with a mobile station requires a large amount of air interface bandwidth, because there is a large overhead in setting up a connection with the mobile station. Also, the communication with the mobile station's application may wake the mobile station from its low-power dormancy mode, which means that the battery life of the mobile station may be reduced.

UMTS and EV-DO networks are capable of providing many different types of services to the mobile station. For example, these networks may provide a Multimedia Broadcast Multicast Service (MBMS). Another example service is known as a "Buddy List." A buddy list allows an end user to track friends and family for quick instant messages (IM), or track the physical location of a buddy. Tracking of a buddy may be an invaluable function for any parent that wants to keep track of their children.

However, to keep track of a buddy(s) requires frequent communication between the network and the mobile station. An application may require the physical location of several people in a person's buddy list. It is desirable to broadcast ones own location about once per minute to update all the buddy lists. Therefore, a mobile station may receive a message from each buddy about once per minute. For even 4 or 5 people, this means that the mobile station is constantly generating messages, and receiving an even larger number of messages, which takes up network resources and consumes power of the mobile station.

SUMMARY OF THE INVENTION

Example embodiments of the present invention relate to a wireless network including a base station and a method of receiving a stack of information at a base station.

In an example embodiment of the present invention, a method of managing information at a base station in a wireless network includes determining whether first information is at least one of low priority information and high priority information. The method further includes queuing the information if the information is low priority information, and sending the information to a mobile station if the information is high priority information.

In another example embodiment of the present invention, a method of managing information at a base station in a wireless network includes determining whether information requested in a received information request is locally stored at the base station, sending the requested information to the wireless network if the requested information is determined to be locally stored, and sending the information request to a mobile station if the requested information is determined not to be locally stored.

In yet another example embodiment of the present invention, a base station in a wireless network for managing information includes a mobile emulator configured to receive first information from the wireless network, and a user agent and proxy (UAP) configured to determine whether the first information is at least one of low priority information, high priority information, and a request for information. The UAP queuing the first information if the first information is determined to be low priority information, sending the first information to a mobile station if the first information is determined to be high priority information, and further determining whether the requested information is stored in the UAP if the first information is determined to be the requested information, the UAP further sending the requested information to the wireless network if the requested information is determined to be stored in the UAP, and sending the request for information to the mobile station if the requested information is determined to not be stored in the UAP.

BRIEF DESCRIPTION OF THE DRAWINGS

Example embodiments of the present invention will become more fully understood from the detailed description given herein below and the accompanying drawings, which are given by way of illustration only and thus are not limiting of the example embodiments of the present invention.

DETAILED DESCRIPTION OF THE EXAMPLE EMBODIMENTS

Although example embodiments of the present invention will be described with reference to an EV-DO network including terminologies, a person of ordinary skill will recognize the present invention may be applied to other telecomunication systems.

It will be understood that, although the terms first, second, third etc. may be used herein to describe various elements, components, regions and/or sections, these elements, components, regions and/or sections should not be limited by these terms. These terms may be only used to distinguish one element, component, region, or section from another region or section. Thus, a first element, component, region or section discussed below could be termed a second element, component, region or section without departing from the teachings of the present invention.

The terminology used herein is for the purpose of describing particular example embodiments only and is not intended to be limiting. As used herein, the singular forms "a", "an" and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-section illustrations that may be schematic illustrations of idealized embodiments (and intermediate structures). Thus, the example embodiments should not be construed as limited to the particular location and arrangements illustrated herein but are to include deviations thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
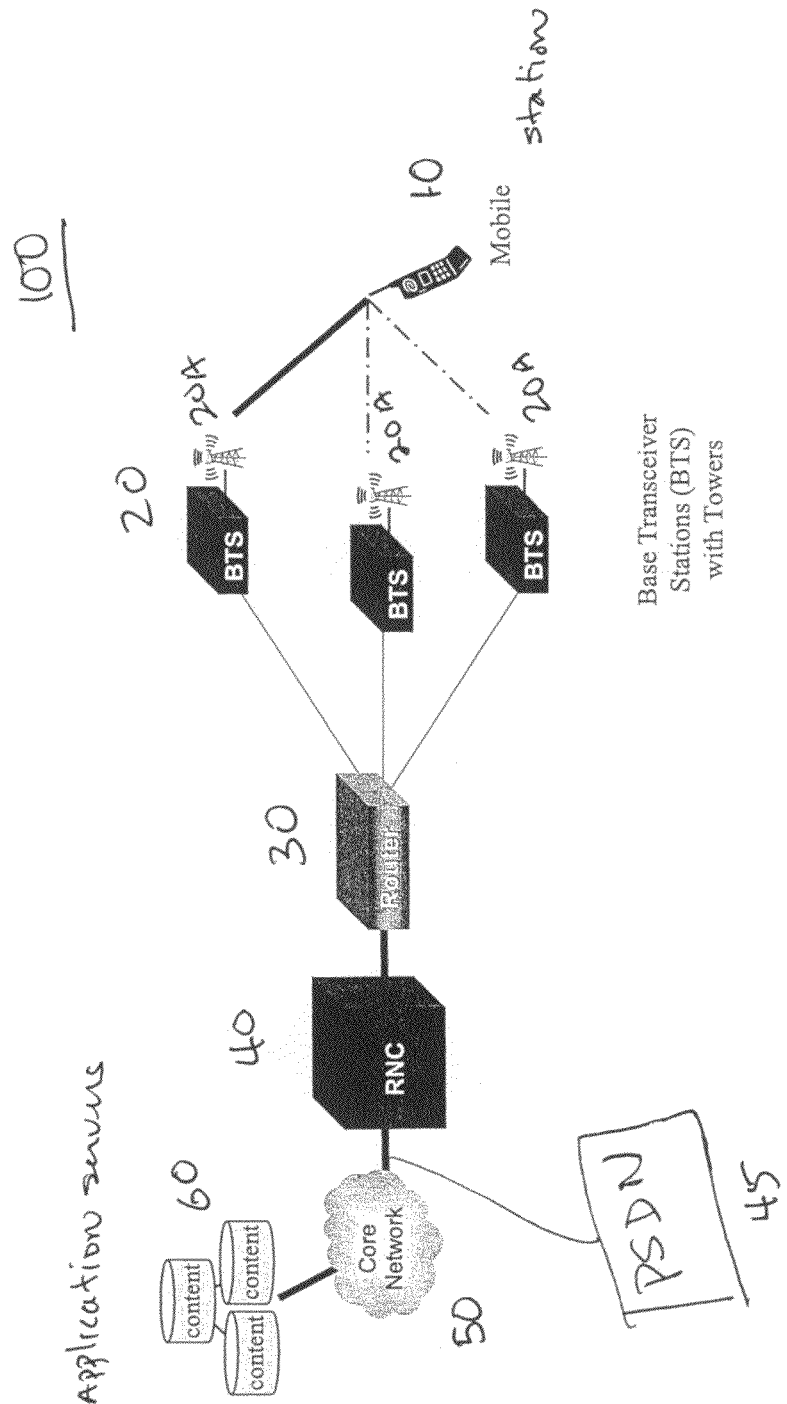
FIG. 1 illustrates a conventional mobile network.

FIG. 1 illustrates a conventional wireless network 100, for example, an EV-DO network. A mobile station 10 may be in contact with a plurality of base station transceivers (BTS) 20 having radio towers via 20A via air interface. The mobile station 10 may be a cellular phone, personal computer, personal digital assistant (PDA) or other similar devices equipped for wireless access to the wireless network 100. The mobile station 10 monitors the radio signal strength among the plurality of BTSs 20 (active set). The signal strength is reported to a radio network controller (RNC) 40, and then one of a plurality path is selected for the mobile station 10 to communicate with a core network 50.

The BTS 20 may be connected the RNC 40 through a router 30. The router 30 may switch traffic from the BTS 20 to the RNC 40 and vice versa. The RNC 40 is further connected to a packet servicing data node (PSDN) 45, which is connected to the core network 50. The RNC 40 is a component that interfaces with the core network 50, controls the radio transmitters and receivers in the BTS 20, and may perform other radio access and link maintenance functions. The PSDN 45 acts as a connection point between an access network (i.e., BTS 20 and RNC 40) and the core network 50. The core network 50 may be a private network connected to a plurality of application servers 60. The core network 50 may be directly connected or connected via, for example, the Internet to the application servers 60. The application servers 60 may provide a Multimedia Broadcast Multicast Service (MBMS) and a buddy list service to the mobile station 10.

As discussed above, contact with the wireless network 100 reduces the battery life of the mobile station 10, because the mobile station 10 must expend energy to generate and receive radio transmissions. In addition, the air interface is bandwidth limited.

Figure 2:
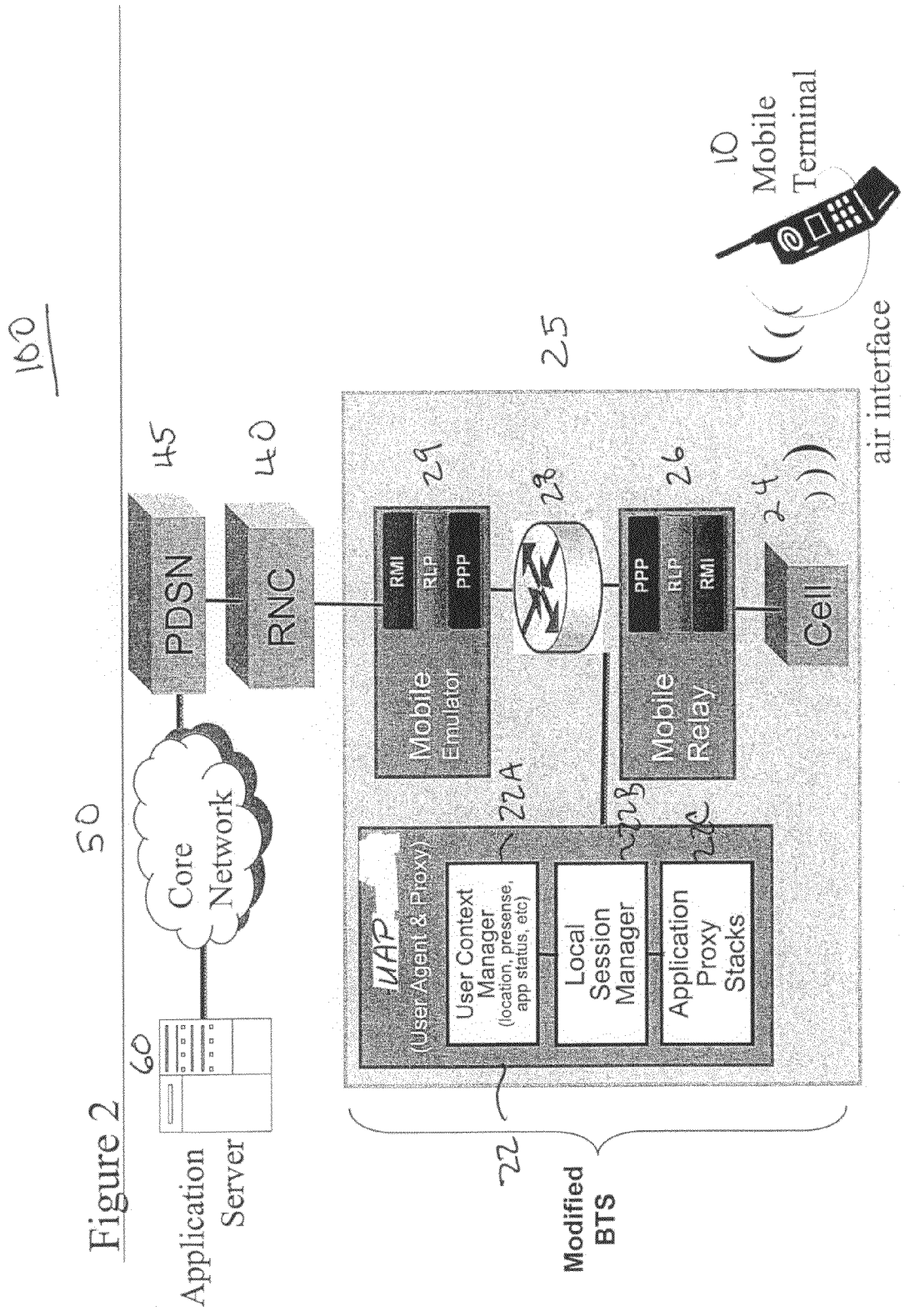
FIG. 2 illustrates a mobile network including a base station of an example embodiment of the present invention.

Accordingly to an example embodiment of the present invention, one or more of the BTSs 20 may be modified to include one ore more user agents. Each of the user agents may represent an associated mobile station 10. As illustrated in FIG. 2, a user proxy and agent UAP 22 may be provided in a modified BTS 25. The modified BTS 20 may further include a mobile relay (MR) 26 and a mobile emulator (ME) 29. It will become obvious to a person of ordinary skill that the UAP 22, the MR 26 and the ME 29 may be located at another network component, for example, the RNC 40, or the mobile station 10 and other network components may be modified to provide the functionality disclosed below.

Information relevant to the user's location, presence, status, etc., may be stored in the UAP 22 of the modified BTS 25. In detail, within the UAP 22 a user content manager (UCM) 22A may store information regarding a user. The UCM 22A may store (host) almost anything, for example, the physical location, what the user is doing (surfing the Web, on a call, etc.), the last time the user interacted with a phone, demographic information, etc. In other words, the UCM 22A may store information that an application program may ask for from a mobile station 10.

An application proxy stacks (APS) 22C may be a footprint for a mobile station's application stored on the wireless network 100. For example, if a user receives text messaging replies in an instant messaging (IM) program, those messages may be stored for the application in these stacks, and delivered all at once (saving air interface bandwidth). If a user sets an away message at "be back in 5 minutes", that may also be represented in the APS 22C. When another user receives (looks) at the away message, the APS 22C will reply directly, thereby saving the mobile station 10 from waking up and wasting battery life, and also avoiding usage of the limited air interface bandwidth. The APS 22C mirrors a mobile station 10 by storing information destined for the mobile station 10.

A local session manager (LSM) LSM 22B may coordinate the communication between the mobile station 10 and the other two components, i.e., UCM 22A and APS 22C. The LSM 22B may access the APS 22C and APS 22C and respond to the core network 50 or mobile station 10 as if it was the mobile station 10 and the core network, respectively.

The mobile station 10 and outside network may communicate with the LSM 22B directly, and the LSM 22B decides what information should be directed to or extracted from, the UCM 22A and APS 22C.

Information flows in both directions between the PDSN 45 and the mobile station 10 via the modified BTS 25. In general, the PDSN 45 provides access to the core network 50 (Internet, intranets) and the application servers 60 for the mobile station 10. Information is received by the modified BTS 25 over a wireless radio link from the mobile station 10. A cell 24 passes a stack of information received from the mobile station 10 to the modified BTS 25.

In detail, the stack information of the mobile station 10 is received by the MR 26, which decodes (terminates) the information from the mobile station 10 up to a Point-to-Point (PPP) layer of a protocol stack. Depending on the type of information, the information may be stored in the UCM 22A and/or APS 22C. The information may be routed by a router 28 from the MR 26 to the UAP 22.

On the other hand, information from the PDSN 45 is decoded (terminated) at the ME 29 in the modified BTS 25. Any request for information by, for example, the core network 50 is sent to the UAP 22 via the ME 29. If the UAP 22 has the requested information, the LCM 22B accesses the APS 22C for the requested information and sends the information to the ME 29, thereby avoiding retrieving information from the mobile station 10. If the requested information is not relevant, cannot be located in the UAP 22, or if the information requires immediate transmission to the mobile station 10, the LCM 22B forwards the information to the MR 26 via the router 28, and then the MR 26 sends the request for information through the cell 24 to the mobile station 10. It should be noted that the information may not be just requested information, but may also be updated information.

If, however, the LCM 22B of the UAP 22 determines that the requested information is low-priority, or should be held according to preference settings of either a network operator or the mobile station 10, then the LCM 22B queues the request information in the APS 22C. Based on an appropriate trigger(s), the queue may be forwarded to the mobile station 10. Appropriate triggers may include a timer, a message that cannot be queued, a mobile station 10 sending information to the cell 24, a request for queue download from the mobile station 10, etc. A message that cannot be queued may mean high priority messages.

A protocol or protocol stack may be considered as a method of connecting and transferring information between two endpoints. For example, a Radio Link Protocol (RLP) provides a scheme for retransmitting packets across an inherently unreliable radio link to improve transmission reliability. The use of a layered stack allows for communication to easily flow across different physical interfaces (e.g., air and wire), and different network types. For example, two PC applications may talk to each other using their own protocol, which itself is placed inside the Internet Protocol (IP) to move information across the Internet. The IP maybe layered on top of physical protocols that address the unique requirements of various air and wire interfaces.

Remote method invocation (RMI) is a protocol between a cell 24 and the RNC 40 for all bearer path traffic and associated signaling (e.g., the voice phone calls and the necessary overhead for the voice calls). For example, on a voice-over-IP call a phone will generate a voice frame, and place it in a protocol stack, usually RTP/UDP/IP/PPP (meaning the voice frame will have a real time transport (RTP) header, a user datagram protocol (UDP) header, an IP header, and then a PPP header placed on it). The PPP frame will be divided up into smaller frames, with each smaller frame getting its own RLP header. The RLP frame is sent over the air. Normally, the cell 24 receives the RLP frame, adds an RMI header with additional information, and forwards it to the RNC 40. The process in reverse is much the same, with RMI between the RNC 40 and cell 24, and only RLP over the air. In addition, some call-related information may be sent on RMI frames between the cell 24 and the RNC 40 (e.g., messages related to handoffs), but those do not contain RLP frames.

In example embodiments of the present invention, the modified BTS 25, i.e., the MR 26 and ME 29, re-assembles the PPP frame from the smaller frames with the RLP, extracts or adds information from the UAP 22 as needed, re-divides everything into RLP frames, adds RMI headers, and forwards them accordingly from the RNC 40 to cell 24, or in the reverse.

Any information stored in the modified BTS 25, the UAP 22, including any queued messages and states of the MR 26 and ME 29, must move during the handoff of the mobile station 10. A handoff occurs when mobile station 10 stops communicating with one of the plurality of BTS 25 and switches to another BTS 25. After the handoff, the state of the UAP 22 must be forwarded to the new BTS 25 or a call will be dropped, because much of the setup between the ME 29 and the RNC 40 will not match the setup between the MR 26 and the mobile station 10. It should be noted that a direct connection between the mobile station 10 and the RNC 40 is not possible in this situation.

Although in general, the plurality of BTS 25 do not communicate with each other, in example embodiments of the present invention a person of ordinary skill will appreciate that if a mobile station 10 has to be handoff from one BTS 25 to another BTS 25, information stored in the UAP 22 of a servicing BTS 25 must be also sent to a target BTS 25 as described above. It will be appreciated that a BTS-to-BTS protocol, for example, may be created to send the information stored in the servicing BTS 25 to the target BTS 25.

Figure 3:
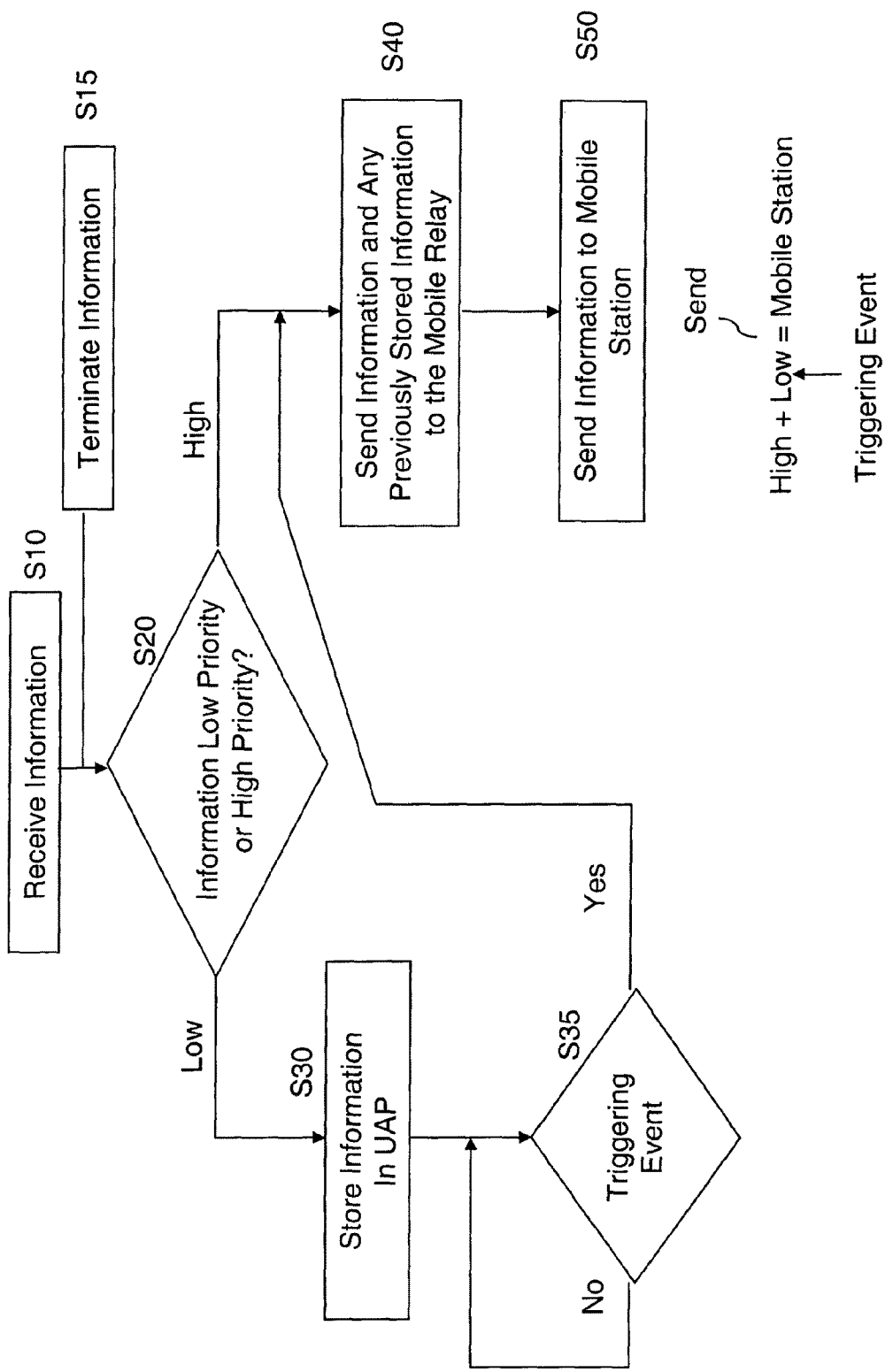
FIG. 3 is a flow chart showing a method of an example embodiment of the present invention.

An example embodiment of the present invention will now be described with reference to FIGS. 2 and 3. FIG. 3 is a flow chart showing a method of an example embodiment of the present invention. For the purpose of example only, assume a user, i.e., mobile station 10, has five (5) people on a buddy list. As described in the background, each person on the buddy list may broadcast their location once very one (1) minute.

Information is received by a modified BTS 25 at S10. Here, the "information" may be buddies on a buddy list broadcasting their location. In the modified BTS 25, the information may be received by a ME 29. If the information is a stack of information, the ME 29 terminates (e.g., decodes) the stack of information at S15. Then a router 28 passes the information to a UAP 22. In the UAP 22, a LSM 22B determines whether the received information is of low or high priority at S20. Again, if information is related to a buddy's location broadcast, information that a buddy has moved more than 5 miles since its last broadcast may be high priority. This type of priority may be set by the mobile station 10 user or a provider, and stored in the APS 22C.

If the information is low priority, the LSM 22B may store the information in an APS 22C at S30. The information remains, e.g., queued, in the APS 22C until a triggering event. A triggering event may be the passage of time. For example, after 30 minutes the LSM 22B retrieves the stored information in the APS 22C, and the LSM 22B sends the information to the router 28, which then sends the information to a MR 26 at S40. In addition to the information stored at step S30, there may have been previously stored information at the APS 22C. Those previously stored information may also be sent to the MR 26 based in the triggering event. The information may then be sent through a cell 24 to a mobile phone 10 at S50. Another example of a triggering event may be the modified BTS 25 receiving high priority information. Here, because the high priority information is not queued in the APS 22C but sent to the mobile station 10, the high priority information may be a trigger for the LSM 22B to send the queued low priority information along with the high priority information to the mobile station 10.

If in step S20 the information is high priority, the information is sent back though the router 28 to the MR 26 at S40. The information may then be sent through the cell 24 to the mobile phone 10 at S50.

Figure 4:
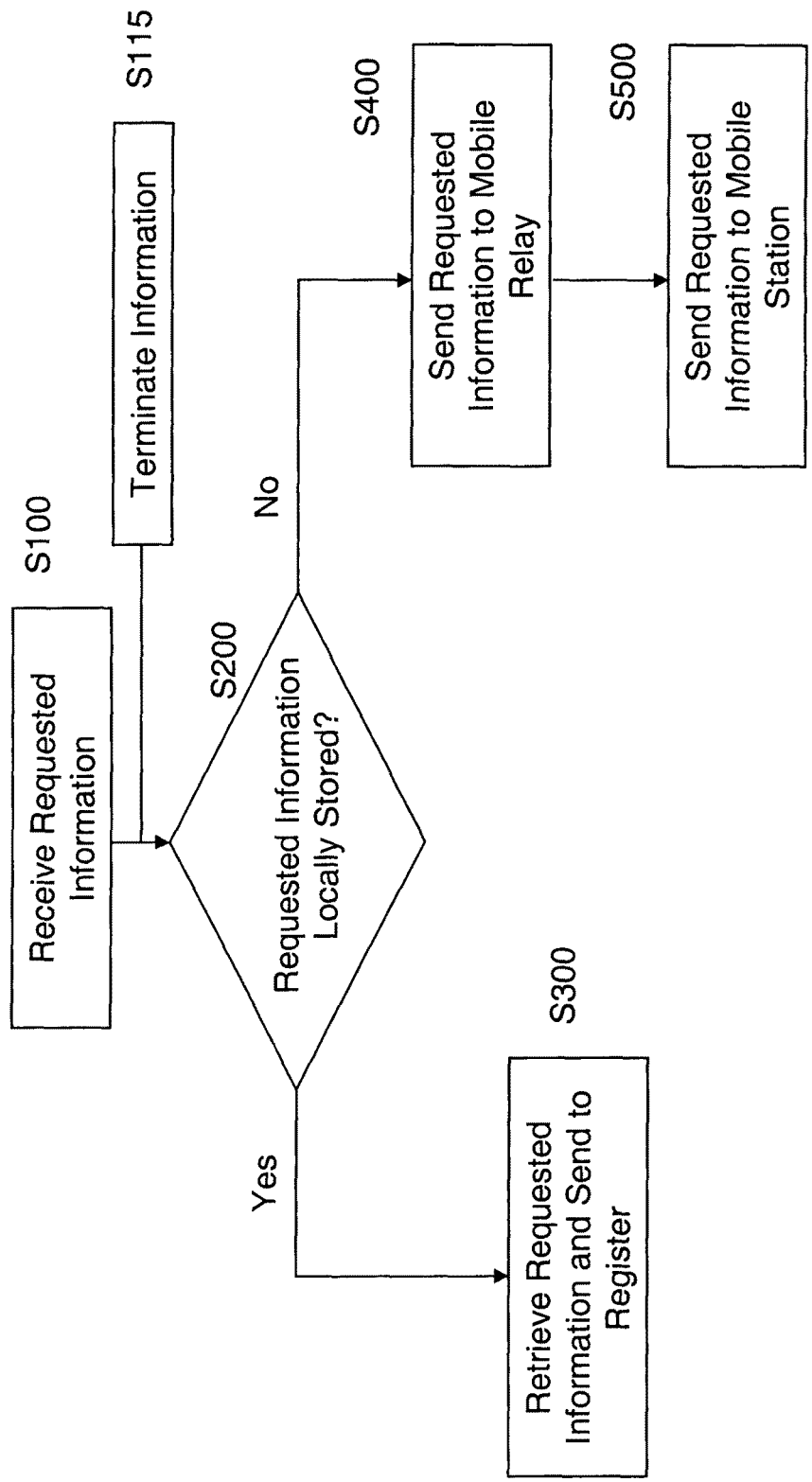
FIG. 4 is a flow chart showing another method of an example embodiment of the present invention.

With reference to FIGS. 2 and 4, another example embodiment of the present invention will be described. FIG. 4 is a flow chart showing another example embodiment of the present invention.

Information received by the modified BTS 25 at S100 may be a request for information from the core network 50. The information may be received by a ME 29. If the information is a stack of information, the ME 29 terminates (e.g., decodes) the stack of information at S115. The request for information may be a request to start an instant messaging (IM) with a mobile station 10, or the request for information may be a request for the user's location.

A ME 29 sends the request for information through a router 28 to an UAP 22. The LSM 22B in the UAP 22 determines whether the mobile station 10 has set a message at S200. The message may be a notification that the mobile station 10 cannot be disturbed for IM. Retrieving this information from an APS 22C and/or a USM 22A, the LSM 22B of the UAP 22 sends the retrieved information to the requester via the router 28 and ME 29 at S300. The retrieved information may be a notification of the status of the availability of the mobile station 10 user, information for the location of the mobile station 10, etc.

In step S200, the LSM 22B may determine that the requested information is not stored in the UCM 22A and APS 22C. In this case, the LSM 22B sends the requested information back to the router 28, and then the router 28 sends the request for information to a MR 26 at S400. Finally, the MR 26 sends the request for information to a cell 24, which then sends the request for information to the mobile station 10 at S500.

Figure 5:
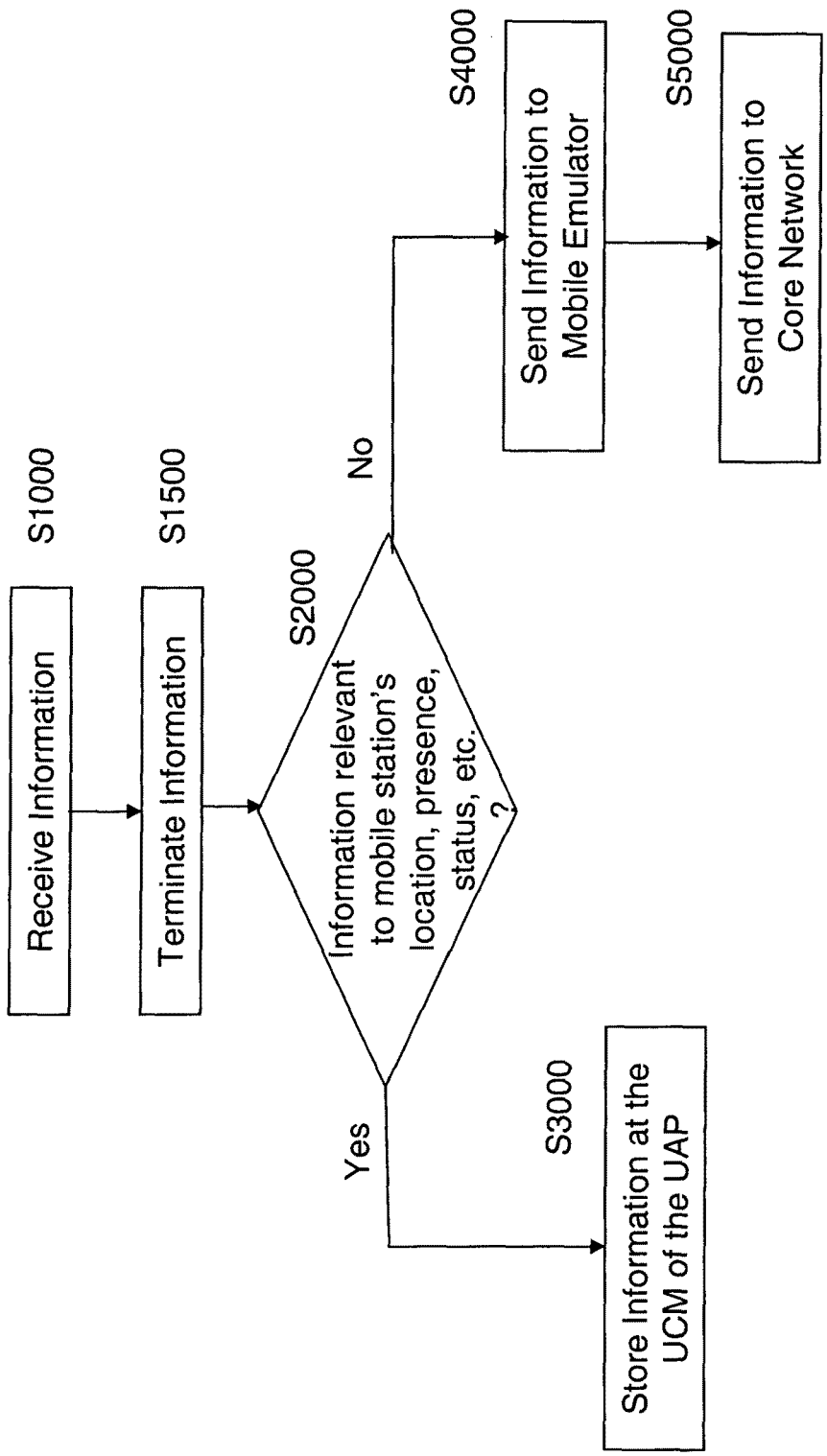
FIG. 5 is a flow chart showing yet another example embodiment of the present invention.

With reference to FIGS. 2 and 5, another example embodiment of the present invention will be described. FIG. 5 is a flow chart showing another example embodiment of the present invention.

A modified BTS 25 may receive information sent by a mobile station 10 at S1000. A ME 26 may receive the information, and if the information is a stack of information, the ME 26 may terminate (e.g. decode) the stack of information at S1500. If the information is a mobile user's state, for example, information relevant to the mobile station's location, presence, status, etc., the information is sent to a UAP 22 at S2000 and stored in a USM 22A at S3000. If the information is not relevant to the mobile station's location, presence, status, etc., the information is sent to a ME 29, where the information is encoded at S4000. Then the ME 29 sends the information to a core network 50 at S5000.

Example embodiments of the present invention allow a user to store the user's location information and other information in an agent on the wireless network, so any application requesting the location or other information will not necessarily wake a mobile station or unnecessarily use air bandwidth. Since the information is shared through a low-power pilot channel between the mobile station and the network, there is no need for the information to be explicitly sent through a traditional data connection. In addition, the network through a user proxy and agent (UPA) stores and queues messages intended for the mobile station, and delivers the messages all at once. Example embodiments allow many disparate communications with the mobile station to be synchronized, require only one connection set-up, and use the air interface as efficiently as possible, because it is inherently more efficient on an air interface to send a single burst than multiple small pieces of information.

What is claimed is:

1. A method of managing information for a first mobile station at a base station in a wireless network, comprising:
   determining whether first information for the first mobile station is at least one of low priority information and high priority information based on a location of a second mobile station;
   queuing the first information if the first information is determined to be low priority information; and
   sending the first information to a mobile station if the first information is determined to be high priority information.

2. The method of claim 1, further comprising:
   receiving an information stack from the wireless network, the information stack including the first information; and
   terminating the information stack.

3. The method of claim 1, further comprising:
   sending the queued low priority information to the first mobile station based on a trigger.

4. The method of claim 3, wherein the trigger is at least one of a timer, a request to download queued information by the first mobile station, and receiving high priority information by the base station.

5. The method of claim 1, wherein the sending step sends the queued low priority information to the first mobile station along with the high priority information.

6. The method of claim 1, further comprising:
   receiving second information from the first mobile station; and
   locally storing the second information.

7. The method of claim 6, further comprising:
   receiving an information stack from the first mobile station, the information stack including the second information; and
   terminating the information stack.

8. The method of claim 6, wherein the second information includes at least one of a location of the first mobile station, last activity of the first mobile station, the last time a user of the first mobile station interacted with the first mobile station, and demographic information of the user of the first mobile station.

9. The method of claim 1, further comprising:
   transmitting the queued low priority information to a target base station during a handoff.

10. A method of managing information at a base station in a wireless network, comprising:
    determining whether information requested in a received information for a first mobile station is locally stored at the base station;
    sending the requested information to the wireless network if the requested information is determined to be locally stored;
    sending the information request to a mobile relay if the requested information is determined not to be locally stored; and
    receiving the requested information if the requested information is determined not to be locally stored and determining whether first information for the first mobile station is at least one of low priority information and high priority information based on a location of a second mobile station.

11. The method of claim 10, further comprising:
    receiving an information stack from the wireless network, the information stack including the information request; and
    terminating the information stack.

12. The method of claim 10, further comprising:
    receiving second information from the first mobile station; and
    locally storing the second information.

13. The method of claim 12, further comprising:
    receiving an information stack, the information stack including the second information; and
    terminating the information stack.

14. The method of claim 13, wherein the second information includes at least one of a location of the first mobile station, last activity of the first mobile station, the last time a user of the first mobile station interacted with the first mobile station, and demographic information of the user of the first mobile station.

15. The method of claim 12, wherein the requested information is the second information.

16. A base station in a wireless network for managing information, comprising:
    a mobile emulator configured to receive first information from the wireless network; and
    a user agent and proxy (UAP) configured to determine whether the first information is at least one of low priority information, high priority information, and a request for information, the UAP queuing the first information if the first information is determined to be low priority information, sending the first information to a st mobile station if the first information is determined to be high priority information, and further determining whether the requested information is stored in the UAP if the first information is determined to be a request for information, the UAP further sending the requested information to the wireless network if the requested information is determined to be stored in the UAP, and sending the request for information to the mobile station if the requested information is determined to not be stored in the UAP, wherein the UAP is configured to determine whether the first information for first mobile station is at least one of low priority information and high priority information based on a location of a second mobile station.

17. The base station of claim 16, wherein the UAP comprises:
- a user content manager (UCM) configured to store mobile station information;
- an application proxy stack (APS) configured to mirror information located in the first mobile station and store the queued low priority information; and
- a local session manager configured (LSM) to coordinate communication between the UCM and APS with at least one of a wireless network and a mobile station.

18. The base station of claim 16, further comprising:
a mobile relay configured to receive second information from the first mobile station, the second information including the requested information.

19. The base station of claim 18, further comprising:
a router configured to route at least one of the first and second information between the mobile relay and the mobile emulator, route the first information between the mobile relay and the UAP, and route the second information between the mobile emulator and the UAP.

20. The base station of claim 16, wherein the UAP is configured to send low priority information to the first mobile base station based on a trigger, the trigger being based on transmission of high priority information.

* * * * *